Jan. 21, 1941. C. E. MASON ET AL 2,229,417
CONTROL
Filed July 31, 1935 10 Sheets-Sheet 2
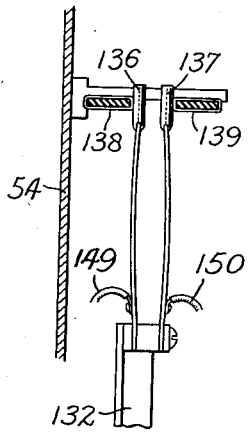
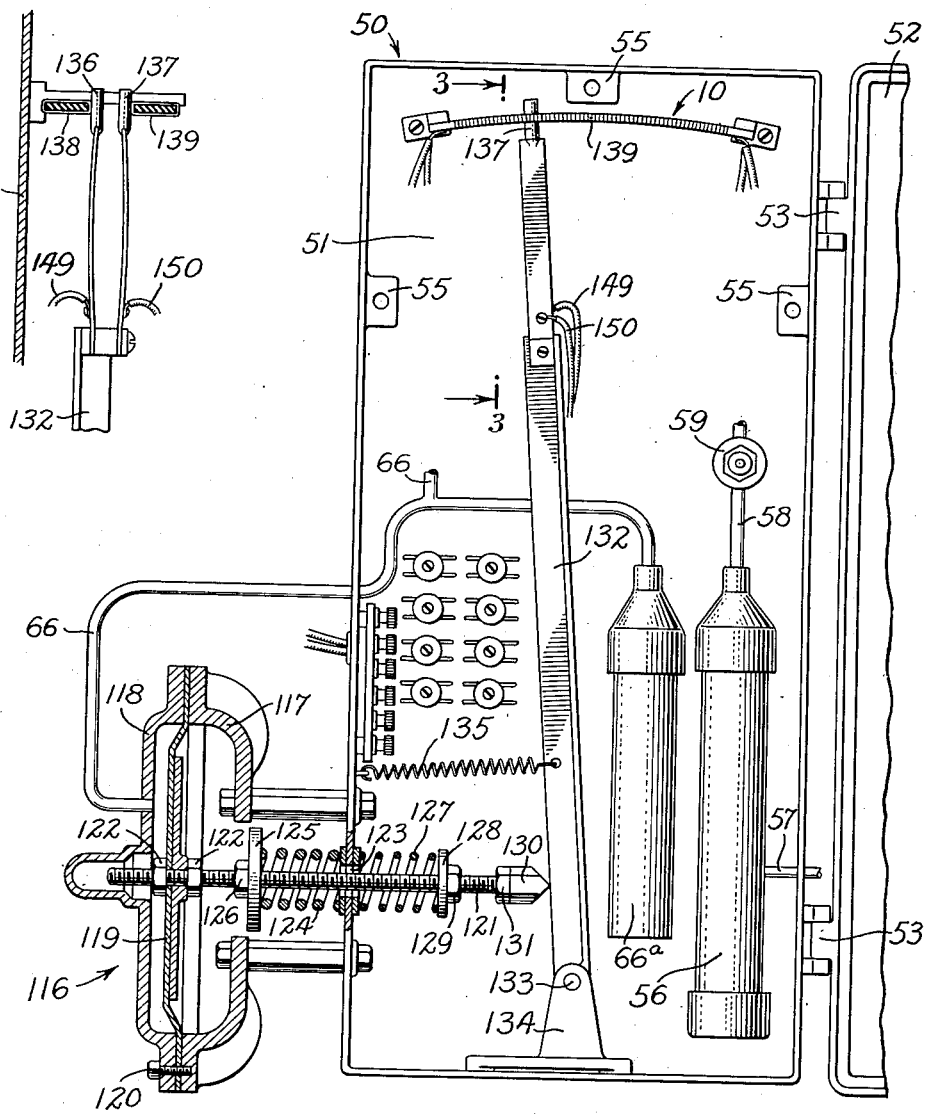
INVENTORS
Cuthbert J. Brown
Webster W. Frymoyer
Clesson E. Mason
BY
Blair, Curtis & Dunne
ATTORNEYS

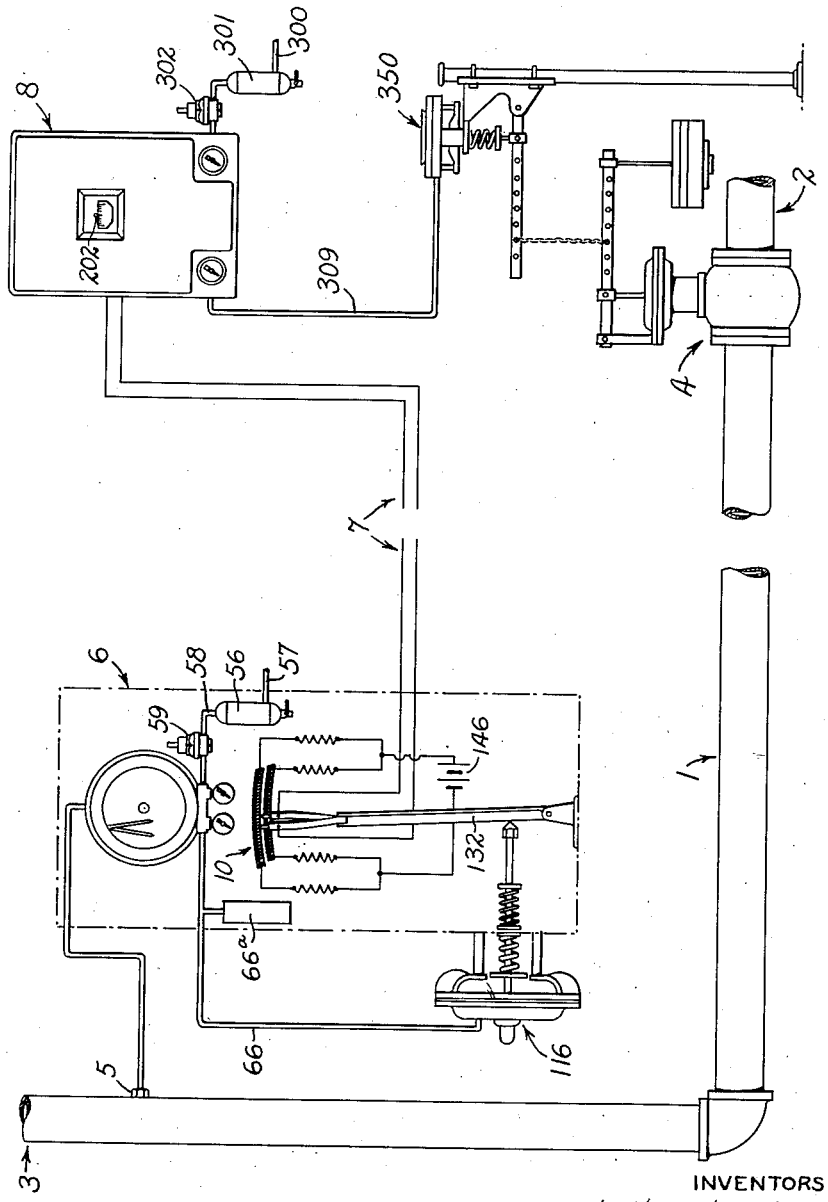

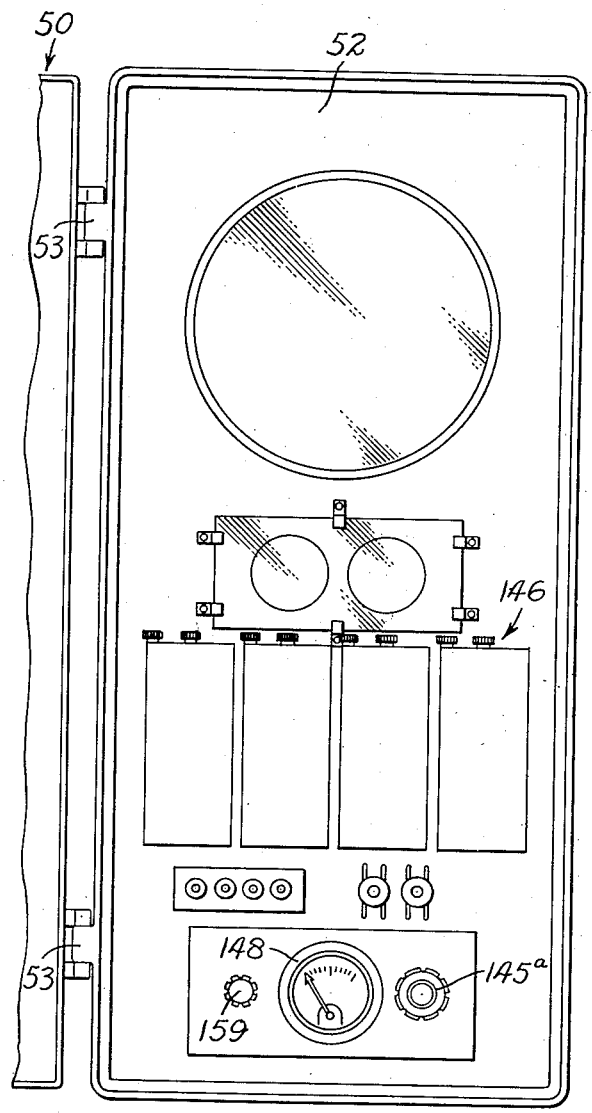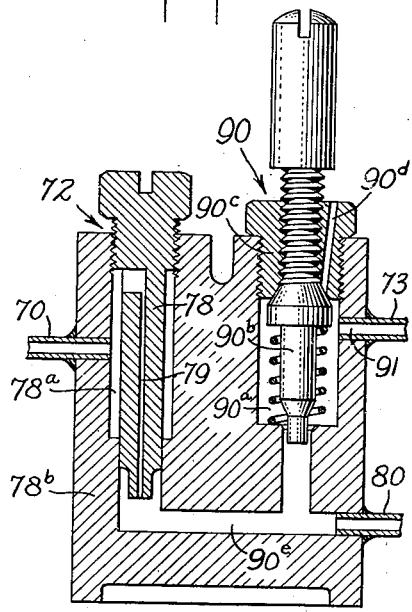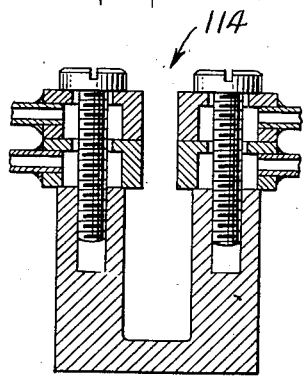

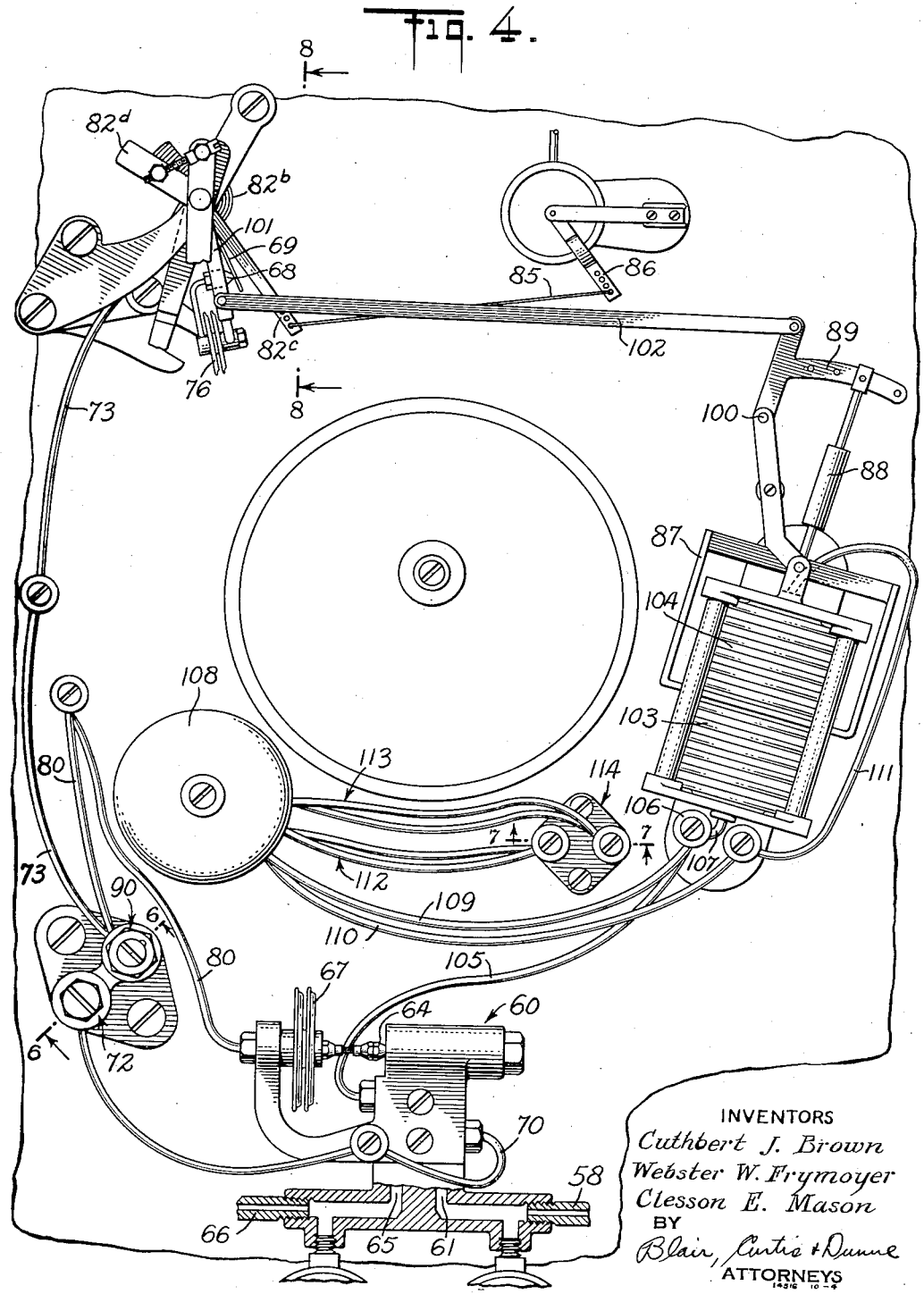

INVENTORS
*Cuthbert J. Brown*
*Webster W. Frymoyer*
*Clesson E. Mason*
BY
*Blair, Curtis & Dunne*
ATTORNEYS

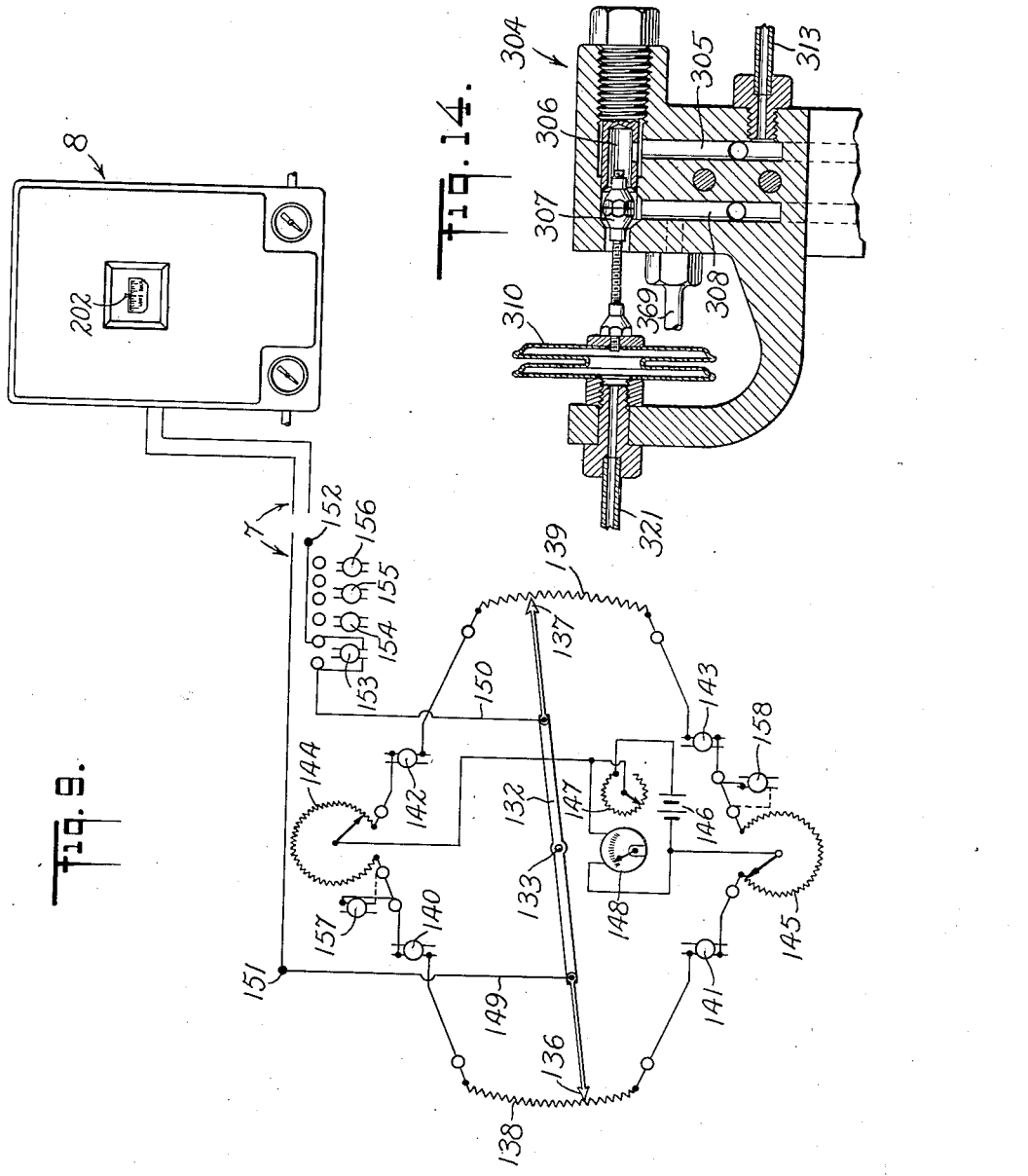

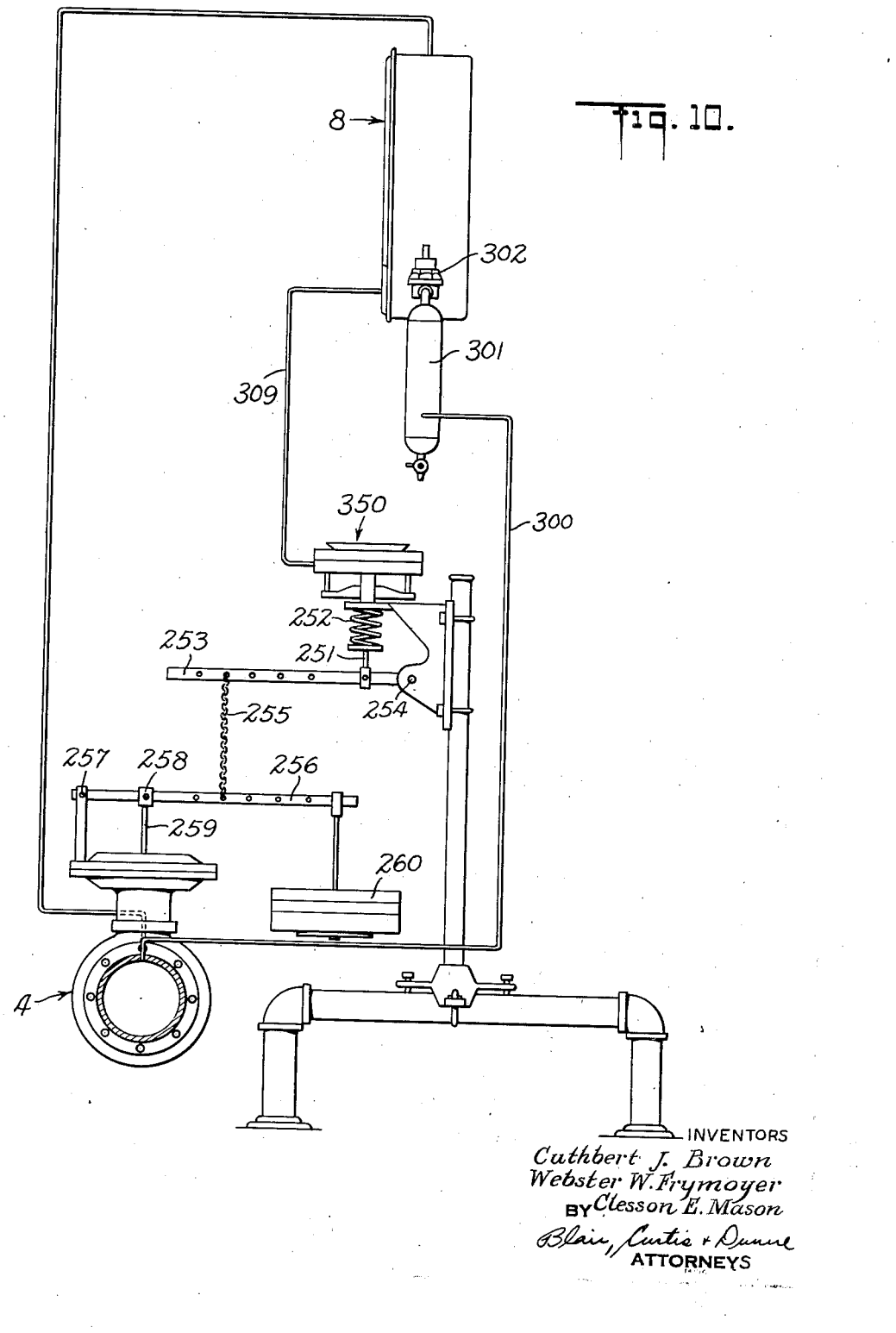

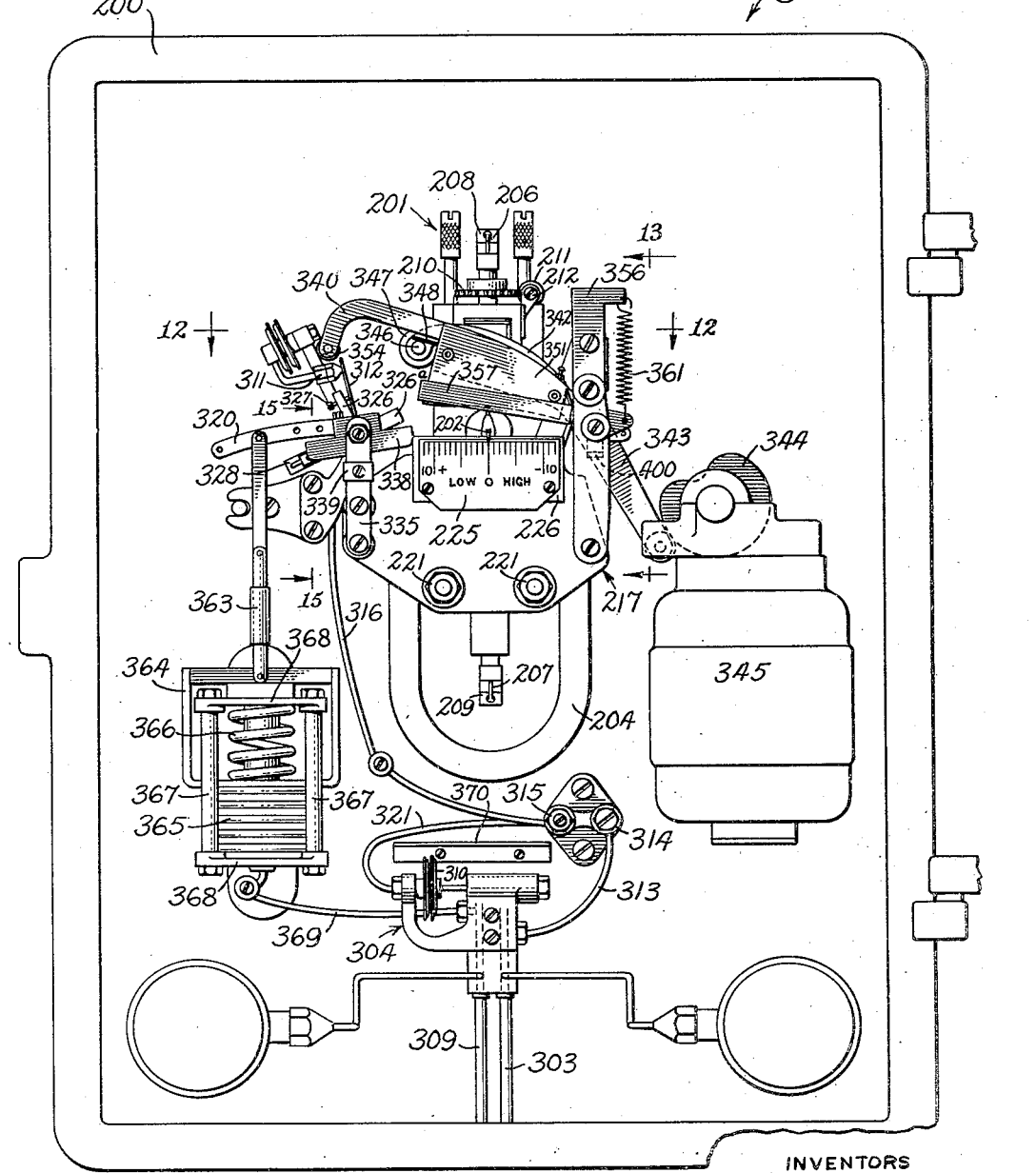

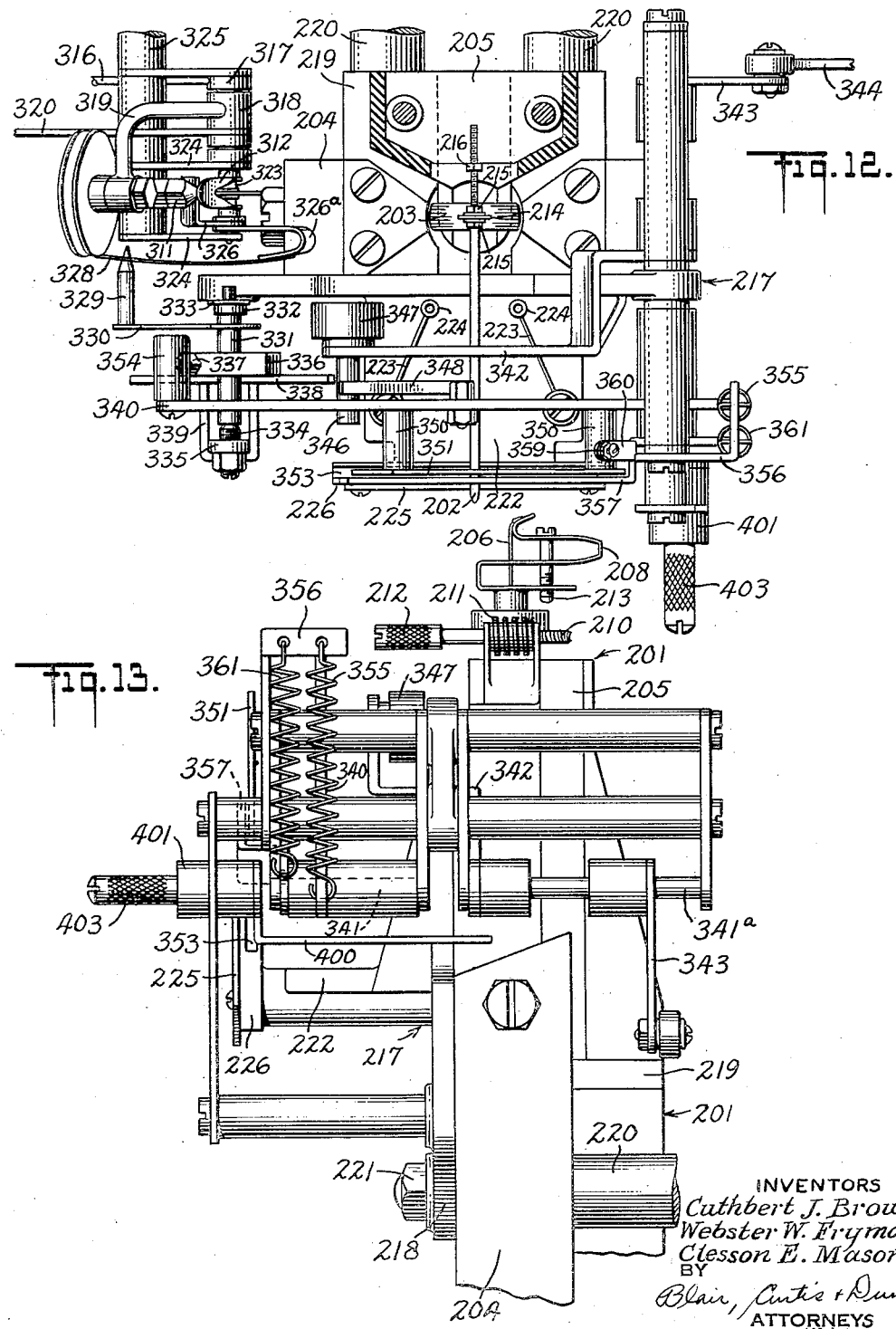

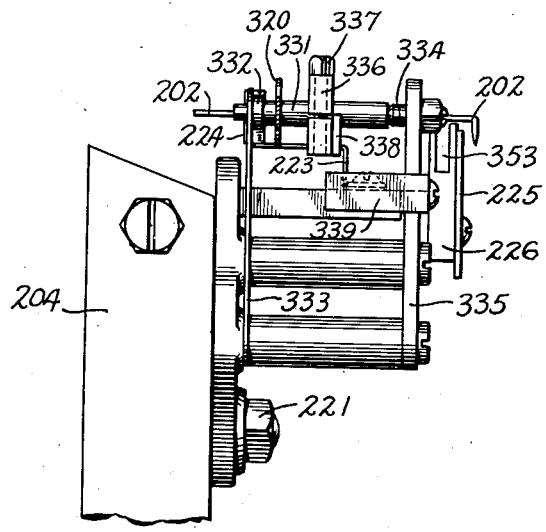
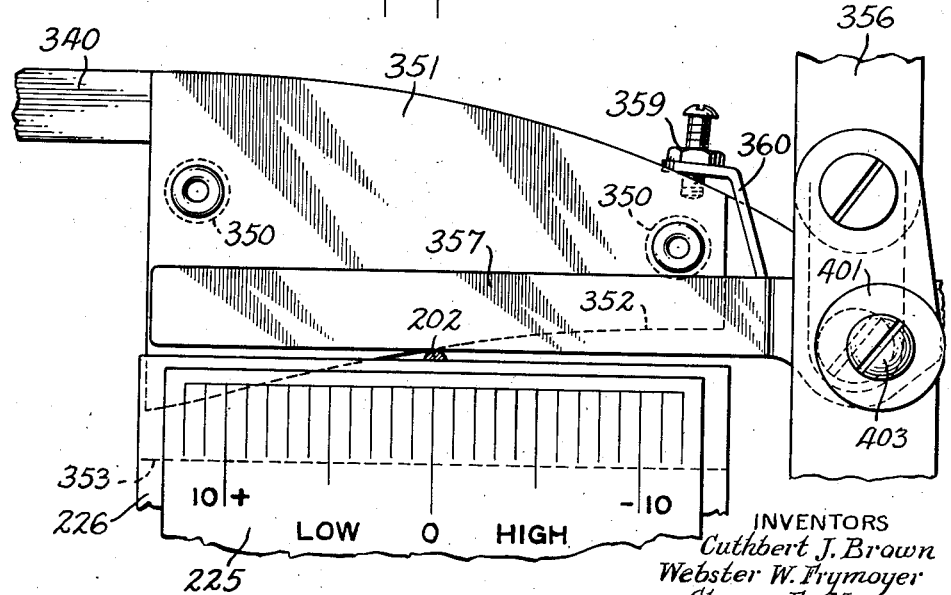

Patented Jan. 21, 1941

2,229,417

UNITED STATES PATENT OFFICE 2,229,417

CONTROL

Clesson E. Mason, Cuthbert J. Brown, and Webster W. Frymoyer, Foxboro, Mass., assignors to The Foxboro Company, Foxboro, Mass., a corporation of Massachusetts Application July 31, 1935, Serial No. 34,110

8 Claims. (Cl. 50—10)

This invention pertains to remote control wherein a desired condition, for example, a pressure condition at one place is controlled by controlling regulating control means, for example a valve, located at a place appreciably distant from the first place.

It is an object of this invention to provide efficient practical means for accomplishing such remote control.

Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which are shown one or more of the various possible embodiments of this invention—

Figure 1 is a diagrammatic view of an apparatus embodying the invention installed to control the pressure in a gas main.

Figure 2 and Figure 2a show a housing opened in which mechanism of the transmitter is located.

Figure 3 is a vertical section on lines 3—3 of Figure 2 showing construction of certain sliding contacts.

Figure 4 is a front elevation of part of the control mechanism mounted in the housing shown in Figures 2 and 2a.

Figure 6 is a section through lines 6—6 of Figure 4 showing a reducing tube and a regulating valve.

Figure 7 is a view showing coupling connections for tubing.

Figure 9 is a diagrammatic view showing an electrical circuit used in the present embodiment.

Figure 10 is a side elevation showing diagrammatically the receiving mechanism shown in Figure 1.

Figure 11 is a front elevation of part of the receiver mechanism mounted in a housing. The cover is shown opened.

Figure 12 is a top plan view of the mechanism shown in Figure 11.

Figure 13 is a right side elevation of the mechanism shown in Figure 11.

Figure 14 shows in vertical section a control head shown in elevation in Figure 11.

Figure 15 is a left side elevation of some of the parts shown in Figure 11.

Figure 16 is a detail front elevation showing the mechanism of Figure 11 in a needle clamping position.

Corresponding reference characters refer to corresponding parts throughout the several views of the drawings.

Figure 8:
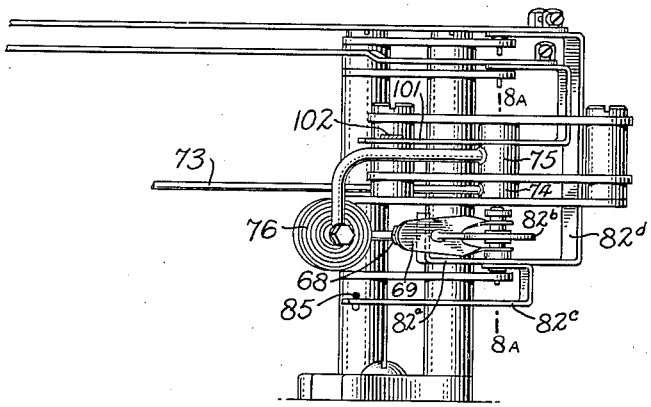
Figure 8 is a section through line 8—8 of Figure 4.

Referring to Figure 1 wherein is diagrammatically shown an embodiment illustrative of the invention, a gas main, generally indicated at 1, conducts gas such as industrial or illuminating gas from a source of supply generally indicated at 2 to a place of demand or consumption generally indicated at 3. The demand end or place of consumption is often considerably removed from the source of supply as where a plant for manufacturing gas used for industrial and domestic purposes is located some distance from the city where the gas is consumed. Often times such plants are located fifteen or more miles from the place of consumption.

At the supply end there is a valve generally indicated at 4 for controlling the flow of gas to the main. At the demand end there is a pressure sensitive element 5, sensitive to the pressure of gas in the main.

The pressure sensitive device is connected with a transmitting apparatus generally indicated at 6. The transmitter is connected through electrical conductors generally indicated at 7 with a receiving apparatus generally indicated at 8 adapted to position valve 4. The control apparatus thus disclosed in the embodiment is designed to maintain the desired pressure at the demand end, regardless of the amount of the demand (the amount of gas being consumed) by varying the position of valve 4.

It is desirable to maintain the pressure at the demand end between maximum and minimum limits which are close together for various reasons. With pressures at the remand end above the minimum required for satisfactory service, gas loss through leakage is uneconomically high. Yet care must be taken to supply always a minimum pressure at the demand end so that the consumers will be assured of gas flow.

In addition to difficulties raised by the distances involved, is that caused by the compressibility of gas. An appreciable time lapses when a change of valve 4 occurs and the feeling of the change at the pressure sensitive means. Although heretofore attempts have been made to control the demand pressure they have not solved the problems satisfactorily.

The apparatus shown in the present embodiment comprises at the transmitter, mechanism such as shown in the Mason Patent 1,897,135, sensitive to the pressure in pressure sensitive element 5. The mechanism is operated by gas pressure from the main. It has instrumentalities that are responsive to the pressure in the gas main and to the amount that the pressure in the main is separated from the desired pressure (the control point). The instrument is adapted to combine these values into another value (a pressure) which may be considered as representing (when the instrument is in balanced equilibrium condition) the value of the demand or rate of consumption of the gas. This pressure operates a diaphragm motor generally indicated at 116 which varies a resistance, generally indicated at 10, in a Wheatstone bridge circuit. Varying the resistance changes the voltage, and current in the transmission line 7 which may be the usual telephone wires. Thus the electrical current in line 7 is proportional to the demand value at the consumption end of the line.

The receiver comprises generally a galvanometer responsive to the current in the line 7. The position of the galvanometer needle is translated by suitable mechanism into a corresponding gas pressure which operates a diaphragm motor 350 in control of valve 4.

Referring to Figures 2 and 2a, a rectangular case or box generally indicated at 50, is shown for housing the major portion of the transmitting mechanism. The box is preferably deep and is adapted to be mounted in an instrument board. A relatively deep cover 52 is pivotally mounted on the box by hinges 53. The upper part of box 50 supports a base plate (not shown) by means of lugs 55. The plate is spaced forwardly from the back of the box and forms a support for the control mechanism embodying principles described in Mason's Patent No. 1,897,135, issued February 14, 1933. Since the principles of operation of the control mechanism are fully described in said patent, they will be only briefly referred to here.

In the lower right hand corner of Figure 2 is shown a cylinder 56 connected by means of pipe 57 with a supply of gas such as the gas in the main under pressure. The cylinder contains a strainer for removing foreign particles from the gas and also forms a drip well for separating out the moisture. Leading from the top of the cylinder is a pipe 58 (Figure 4) which connects with the header of a control head generally indicated at 60. A reducing valve 59 is inserted in the pipe between the cylinder and control head to regulate the gas pressure supplied to the control head.

Figure 5:
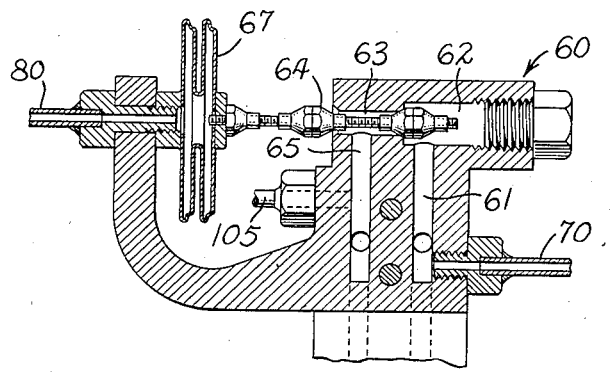
Figure 5 is a vertical axial section showing a control head shown in Figure 4.

The control head forms part of the control mechanism and is shown in greater detail in Figure 5. Pipe 58 communicates with a passage 61 in the header and control head. The passage terminates in a chamber 62. Chamber 62 at its left end communicates with a passage 63 in which is mounted the stem of a double headed valve 64 adapted to determine the pressure existing in the chamber 62. Passage 63 communicates with the atmosphere and also with a port 65 in the control head connected with a pipe 66 leading to a diaphragm motor generally indicated at 116. Valve 64 when in its extreme right hand position completely closes passage 63 to the atmosphere and opens port 65 to chamber 62. In its extreme left hand position valve 64 closes 62 to passage 63 and opens passage 65 to the atmosphere. In intermediate positions pressure in the passage 65 assumes corresponding pressures.

The valve 64 is moved by bellows 67 which is operated by pressure coming from other mechanism located in the upper part of Figure 4. This mechanism includes a control couple comprising a nozzle 68 and a flapper 69.

Figure 8A:
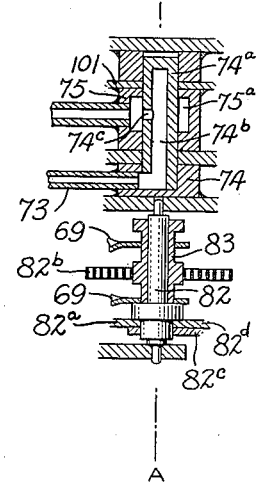
Figure 8a is a detail section through line 8a—8a of Figure 8.

The nozzle is supplied with a constant flow of gas by means of tubing 70 connecting passage 61 with a reducing tube (Figure 6) generally indicated at 72 which tube passes a substantially constant flow of gas. The reducing tube comprises a bored tube 78 having a capillary bore 79 through which gas under pressure must flow in passing from pipe 70. The tube is threadably held in a bore 78a in a block 78b. The diameter of the bore is larger than the diameter of the tube except at the inner end where the two fit tightly. The gas flows from the tubing 70 through the annular space and into bore 79. In the event that the reducing bore 79 becomes clogged, the tube may be removed and cleaned with little difficulty. From the reducing tube the regulated gas flow passes through a manually operable valve generally indicated at 90 by which valve the control mechanism may be operated manually. The valve comprises a chamber 90a and a double headed valve 90b. A passage 90d connects chamber 90a with the atmosphere when the double headed valve is threaded in from its outermost position. By threading the regulated valve further through the sleeve 90c, the pressure in passage 90e may be regulated, that is maintained at a maximum when the valve is in its innermost position and at gradually reducing pressures as it is moved outwardly from its innermost position. In its outermost position the upper seat merely shuts off passage 90d from the atmosphere and the valve serves only as a coupling. From valve 90 by means of port 91 the gas flows through tubing 73 to a stationary cap 74 mounted on an arm suitably supported by the back of the case. The cap and a fixed bored shaft 74a are rigidly secured together as shown (Figure 8a). The shaft has a bore 74b communicating with tubing 73 at one end and an outlet 74c. Fitted over the shaft 74a and freely rotatable thereabout is a collar 75 having an annular groove 75a aligned with the outlet 74c. To the collar 75 is secured by tubing, bellows 76 and nozzle 68. The nozzle is thus pivotally mounted about axis A and supplied with a regulated flow of gas.

The nozzle is positioned by means of a lever 101 connected by a link 102 to a T-lever 89 pivoted at 100. A resilient connecting link 88 connects the base of the T-lever 89 to a rack 87. The connections between link 102 and lever 101, and between lever 89 and link 88 are adjustable to adjust the mechanical advantage between the rack and nozzle.

The rack 87 is positioned between opposing bellows 103 and 104 so that when equal pressures exist in the bellows the rack assumes a neutral position, but when the bellows 103 is supplied with a pressure higher than that in bellows 104, the rack is moved upwardly an amount corresponding to the pressure difference and when bellows 103 has a pressure less than that in the bellows 104, the rack is shifted downwardly an amount corresponding to the pressure difference. The control of and nature of the pressures supplied to the bellows is described in the said Mason patent. They are so governed as to make the position of the rack and consequently the position of the nozzle correspond generally to the position of the flapper 68.

The other element of the control couple, the flapper, is positioned by the pressure sensitive element 5 in the gas main. This is accomplished as follows: (Figure 8a) The flapper is loosely mounted on a sleeve 83 frictionally secured over a spindle shaft 82 whose axis is coincident with the axis A about which the nozzle pivots. The spindle shaft is suitably mounted between supporting arms secured to the base plate. Rigidly secured to the spindle shaft is a lever 82a. The flapper is urged against a stop screw carried by the lever by a hair spring 82b secured at one end to the sleeve and at the other end to the flapper. By turning the sleeve with respect to the central shaft the tension on the hair spring may be adjusted. The spindle shaft and lever 82a is positioned by another lever arm 82c connected by a link 85 to a lever 86 positioned by the pressure sensitive element. The link 85 and lever 82 are preferably adjustably connected so that the movement of the flapper may be moved more or less in response to changes in the pressure. As the stop screw is moved counterclockwise away from the nozzle it carries the flapper with it, but as it is moved clockwise toward the nozzle it may leave the flapper against the nozzle and continue its movement without subjecting the parts to undesirable stresses.

The spindle shaft carries a supporting arm 82d which supports a pen arm or pointer.

The flapper and nozzle coact to vary the pressure in the bellows 67 operating the control head valve. The flapper is moved as described above, whereas the nozzle itself is moved about its axis by the rack 87 moved by the bellows 103 and 104. Thus, as the flapper moves under the influence of the lever 86, the bellows 103 through the action of the nozzle and flapper and the control head 60 causes the nozzle to follow the flapper. However, the nozzle as described in the Mason patent is always under the influence of the equalization of the pressures in bellows 103 and 104, which takes place through the capillary tubing units 108, 109, 110 and 111, any one or all of which may be connected across the two bellows, the amount of capillary tubing thus connected across being varied to give the desired operation as described in the Mason patent.

Pressure on the bellows 103 as described in the Mason patent is made proportional to the demand of the condition being controlled (in the present case the demand on the gas main), and this pressure is translated into an electrical value to be transmitted to the receiver by means of the mechanism and circuits shown in Figures 2, 2a and 9. The diaphragm motor 116 is supported outside the left side of the box by suitable means and comprises an annular base 117, a cap 118 and a flexible diaphragm and plate 119 mounted between the base and cap which are held together by suitable bolts 120. The space between the cap and diaphragm is connected with the control head by the pipe 66. To increase the capacity of the line and motor to cause the motor to respond more slowly to changes in pressure from the control head, a capacity tube 66a may be placed in the line 66.

Mounted on the diaphragm by clamping nuts 122 is a threaded rod 121. The rod extends through an enlarged opening 123 in the side of the box. A relatively heavy spring 124 abutting against the outside of the case wall and against a washer 125 adjustably held in place on the rod by a nut 126 opposes movement of the diaphragm and pressure from pipe 66. A lighter spring 127 abuts the inside of the casing wall and a washer 128 held in place by nut 129. The two springs opposing each other form a resilient frictionless bearing support for the rod passing through the casing wall.

On the end of the shaft is mounted a knife edge block 130 threaded thereon and locked in position by a locking nut 131. The knife edge abuts the edge of a channel bar 132 pivoted at 133 on a support 134 mounted on bottom wall of box 51. A light spring 135 urges the bar against the knife edge.

With this construction the different pressures which may exist in the line 66 are transmitted into diaphragm motions and into the motion of rod 121 which motion is transmitted to the channel bar 132.

The control mechanism and diaphragm motor are preferably operated by gas from the supply main (unless there is a convenient air supply available) and under such conditions it is desirable to operate the mechanism at a pressure two or three pounds below the minimum supply pressure (usually about 7 lbs. per square inch) to allow for fluctuations in the pressure source. Thus it is necessary to select a diaphragm of sufficient area and a spring 124 of the correct characteristics to cause the diaphragm motor to move the lever bar 132 over its entire throw by pressures varying between zero and for example five pounds per square inch gauge pressure.

Movement of the bar 132 is transmitted into electrical values by two contacts, 136 and 137 carried on the upper end of the bar (Figure 3) suitably insulated from the bar and from one another in a known manner. The contacts slide along slide wires 138 and 139 wound on suitable supports mounted on the back of the box and insulated therefrom. Referring to diagram, Figure 9, the slide wires form part of a Wheatstone bridge circuit.

By varying the position of the contacts along the resistance wires 138 and 139 of the bridge, corresponding electrical values are set up which values are transmitted to a galvanometer at the receiver. The wiring of the circuit is shown in Figure 9 and not in Figure 2 showing the mechanical parts since the various electrical connections are those such as a man skilled in the art is familiar with.

The circuit of the present embodiment is one which has proved satisfactory and comprises the two slide wires 138 and 139 (variable resistances) in series with fixed resistances 140, 141, 142 and 143, and manually variable resistances 144 and 145. Across the bridge is connected a battery 146 in series with a variable resistance 147. A voltmeter 148 is connected as diagrammatically shown in Figure 9 across the battery and resistance 147. Leads 149 and 150 from the contacts on bar 132 are connected with the transmission lines 7 at terminals 151 and 152 respectively. To guard against temperature variations in the telephone line causing such changes in the resistance of the bridge and galvanometer circuit as would change the calibration in the instrument, resistances 153, 154 and 155, are provided ahead of terminal 152, and with binding posts so that any one or all of the resistances can be inserted into the circuit to make that portion of the resistance in the galvanometer circuit which is not subject to temperature change so large that the ratio of the change in resistance of the line due to change in temperature to the total resistance is very small and does not cause undesirable errors.

Additional resistances 157 and 158 are also provided to be inserted in opposite sides of the Wheatstone bridge to change the value of the bridge so as to change the amount of voltage or current in the galvanometer circuit in the event that the galvanometer cannot be correctly calibrated with the transmitter by means of varying resistances 144 and 145 as will be explained.

The following table of resistances has been found satisfactory:

| | Ohms |
|---|---|
| Variable resistances 138 and 139____each__ | 600 |
| Fixed resistances 140, 141, 142 and 143 _____each__ | 1500 |
| Fixed resistances 157 and 158_____do____ | 600 |
| Variable resistances 144 and 145__do____ | 620 |
| Fixed resistance 153_____ | 2790 |
| Fixed resistance 154_____ | 600 |
| Fixed resistance 155_____ | 650 |
| Fixed resistance 156_____ | 1500 |
| Voltmeter 148_____ | 620 |

With this circuit it is desirable to have about four volts between variable resistances 144 and 145 and to this end the knob for moving the variable resistance 147 may be shifted to bring the voltage to the desired value.

In the circuit as shown in Figure 9, the voltage across the transmission line is increased and the bridge unbalanced as the contacts 136 and 137 move counter-clockwise from zero position (in which position the diaphragm of the motor 116 is collapsed) to a maximum swing (as when full pressure is supplied to the diaphragm motor). With the variable resistances 144 and 145 which are mounted on a common axis manually movable by a knob 145a, the resistance values of the bridge may be adjusted so that when the contacts 136 and 137 are in their zero position the bridge is balanced and no voltage drop exists across the transmission line. The manner of calibrating the transmitter and receiving instruments will be described after the galvanometer mechanism is described.

Referring to Figure 11, the leads 7 from the transmitter enter the back of the receiver case 200 and are connected through suitable leads not shown with a galvanometer generally indicated at 201 having a needle or pointer 202. The galvanometer comprises the usual armature 203 mounted between the poles of a magnet 204. The armature is mounted in a Bakelite frame 205 by means of suspension wires 206 and 207 suspended from upper and lower resilient supports 208 and 209 respectively mounted on the Bakelite frame. The upper support 208 is pivotally mounted with respect to the frame and carries a gear 210 meshing with a worm gear 211 which may be turned by means of a knob 212 to adjust the torque on the suspension wires. By thus adjusting the radial position of support 208, the neutral position of the armature and needle may be adjusted. The tension on the supporting wires is adjustable by means of screw 213 in support 208 so that the period of the galvanometer may be adjusted. The galvanometer needle 202 is mounted on a strip 214 (extending from the armature) by lock nuts 215. The needle extends back of the armature and is threaded so that a nut 216 may be adjusted along the needle to balance it. The Bakelite frame 205 is mounted on a frame generally indicated at 217 having a vertical face 218 and rearwardly extending shelves 219 for supporting the Bakelite frame and the magnet 204. Frame 217 is mounted on the back of the case 200 and spaced therefrom by spacing sleeves 220 and suitable nuts and bolts 221. To limit the pivotal movement of needle 202 a horizontal forwardly projecting shelf 222 of frame 217 has secured thereto supporting wires 223 carrying small porcelain stops 224 between which the needle swings.

The relationship between the galvanometer and the galvanometer circuit including the Wheatstone bridge at the transmitter is preferably such that movement of the contacts 136 and 137 of the bar 132 from the extreme left position over the range of the slide wires 138 and 139 is sufficient to move the galvanometer needle from (as shown in Figure 11) its left-hand or null position through the half way position to its right-hand position. An index 225 for use with the needle 202 is supported on the front face of an anvil plate 226 secured by suitable screws to the front of horizontal shelf 222.

The galvanometer is preferably set so that when it is short circuited or when the galvanometer circuit is open or when the bridge is so balanced that no current flows through the armature, the galvanometer needle swings to the desired position.

This adjustment may be made in the following manner: With the galvanometer disconnected from the line terminals, adjusting knob 212 at the top of the galvanometer is turned to swing the needle over the desired or zero index reading or number and the terminals are connected. At the transmitter the pressure on the diaphragm motor 116 is released or adjusted to swing the bar 132 to the desired position to correspond to the null or zero position of the galvanometer. The rheostat knob 159 for adjusting the rheostat 147 is turned to obtain a voltage of approximately four volts across the bridge as indicated by voltmeter 148. Starting with the rheostats 144 and 145 in their extreme clockwise position, if the circuit does not swing the needle to the selected zero index, the knob 145a is moved counterclockwise to adjust simultaneously rheostats 144 and 145 until the +11 reading is obtained which indicates a balanced condition of the bridge. If by moving the rheostats 144—145 to their extreme counter-clockwise position the desired position of the galvanometer is not obtained, an additional 600 ohms may be introduced on each side of the circuit by connecting resistances 157 and 158 in the circuit by suitable connections diagrammatically shown in Figure 9. The rheostat knob 145a may now again be adjusted in an effort to balance the bridge and position the galvanometer needle in its open circuit position over the galvanometer zero index.

The bar 132 is now shifted to its extreme right position by supplying diaphragm motor 116 with maximum pressure as by manually screwing down valve 90b to build up the back pressure in passage 90e to expand bellows 67 and move the valve 64 to the right. If this does not cause the needle to swing to its −11 index, the voltage across the bridge may be adjusted by knob 159 to bring the needle into correct position.

The position of the galvanometer needle is thus determined by the setting of the bar 132 which is determined by the value of the demand at the consumption end of the gas main. The galvanometer position is translated by suitable mechanism into a gas pressure which operates a diaphragm motor 350 (Figures 1 and 10). The motor 350, acting through a rod 251 and against spring 252, exerts a force on lever 253 pivoted at 254, which force increases as pressure on the diaphragm motor is increased. Lever 253, through a chain link 255, is connected with a lever 256 (forming part of the pressure regulator) pivoted at 257 and connected at 258 with a rod 259 connected with the valve of the pressure regulator. Rod 259 is also connected with a diaphragm (not shown) as in the usual pressure regulator. The underside of the diaphragm is urged upwardly by the pressure of the gas in the main on the "low" side of the valve. Weights 260 urge lever 256 in a clockwise direction, and the rod 259 in such a way as to move the valve into its wide open position. The pressure against the diaphragm in the pressure regulator tends to move the valve to its closed position. As the pressure on the motor 350 is increased the effectiveness of the weights 260 to increase the opening of the valve is decreased and as a safety feature failure of the air pressure to the motor 350 leaves the pressure regulator to give maximum pressure to the gas main.

The air pressure to the motor 350 is controlled by the position of the galvanometer by means of the translating mechanism shown in Figures 11, 12, 13 and 14. Gas under pressure from the supplying main (Figure 1) is conducted through tubing 300 to a drip well 301 where foreign material is removed. Thence the gas passes to a reducing valve 302 which supplies the desired flow of gas to operate the receiver. From the reducing valve the now regulated gas passes through tubing 303 to a control head generally indicated at 304 where it passes (Figure 14) through a port 305 to a chamber 306. Chamber 306 contains a double headed valve 307 and communicates with the atmosphere at its left-hand end. The chamber 306 also communicates with a port 308 as shown. The valve 307 in its extreme right position cuts off communication between 306 and 308 and exhausts port 308 to the atmosphere. In its extreme left position it cuts off passage port 308 from the atmosphere and permits communication with the chamber 306. In intermediate positions it varies the extent of communication of passage 308 with chamber 306 and with the atmosphere and so determines the pressure existing in the port 308. The port 308 is connected through tubing 309 with the motor 350.

Valve 307 is positioned by the pressure existing in bellows 310 and the pressure in the bellows 310 is determined by the relative positions of (referring to Figure 11) a nozzle 311 and a flapper 312, the operation being similar to that described in connection with nozzle 68 and flapper 69. The connection between nozzle 311 and the bellows 310 is made as follows: port 305 in the control head is connected by tubing 313 to a reducing tube 314 (similar to the reducing tube 72, Figure 6). The reducing tube 314 is connected through a suitable passage to manually operable valve 315 (similar to valve 90, Figure 6). The valve 311 through tubing 316 is connected to a collar 317 which communicates with a shaft similar to that shown in Figure 8a having a port communicating with a collar 318 on which is mounted by tubing 319, the nozzle 311. The collar 318 also carries a lever 320 to move the nozzle and collar 318 about the shaft. The bellows 310 is connected through tubing 321 to the manually operable valve 315.

Referring to Figures 12 and 15, the flapper 312 is freely mounted on a shaft 323 pivotally supported by arms 324 mounted on a built-up support 325 mounted on the back of case 200. Secured to the shaft is an angle arm 326 carrying an adjustable screw 327 against which the flapper is urged by a hair spring secured at one end to a sleeve frictionally held on the shaft 323 and at the other end to the flapper. The shaft 323 is coaxial with the axis about which the nozzle is rotated and the hair spring urges the flapper in the direction of the nozzle. Movement of the angle arm toward and away from the nozzle carries the flapper with it but leaves the flapper against the nozzle in the event that the arm moving in a counter-clockwise direction permits the flapper to contact the nozzle.

Extending from the arm 326 is a resilient spring arm 326a, bent on itself and having at its end a slot 328. The flapper and arm 326a is moved by means of a pointed stud 329, the point of which engages the slot 328. The stud is mounted on an arm 330 secured to a shaft 331 frictionally supported between an end thrust bearing 332 mounted on a resilient support 333 and a thrust bearing 334 adjustably mounted on a support 335. By adjusting the position of the bearing 334, the frictional resistance to the movement of shaft 331 may be adjusted. The supports 333 and 335 are mounted on frame 217. Also mounted on the shaft 331 is a split block 336 clamped to the shaft by tightening nut 337. Suitably mounted on the block 336 is a rocker arm 338 by which arm shaft 331, stud 329 and flapper are positioned, the shaft being coaxial with the axis of rotation of the nozzle and flapper. A U-shaped bracket 339, mounted on the support 335, limits the movement of the rocker.

The rocker and flapper are positioned by the galvanometer through a position translating mechanism comprising generally two rocker arms, one of them a detector arm 340 freely pivoted on shaft 341, the other a lifter arm 342, secured to shaft 341a and forming a bell crank with the shaft and a cam follower arm 343 following a cam 344 constantly driven by a motor 345. The lifter arm carries at its free end a stud 346 and a counterweight 347, the stud extending over the rocker arm 338 and under the detector arm 340. On the detector arm is mounted a spring 348 with which stud 346 contacts as the lifter arm is raised under the detector arm.

Extending forwardly from the detector arm are two spacing studs 350, supporting a detector plate 351 having a curved edge 352 (see Figure 11 and dotted lines). The detector edge is positioned over a notch 353 formed in support 226 over which the needle is normally free to swing. Mounted on the end of the detector arm is a stud 354 which extends over the left end of the rocker bar. As the cam 344 rotates, the cam follower 343 raises and lowers the lifter arm 342. In its raised position the arm 342 contacting with the spring 348 lifts the detector arm 340 free of the needle and free of the rocker bar 338. As the cam continues rotation, the arm 342 lowers and lowers the detector arm 340 until the curved edge 352 of the detector plate 351 contacts the needle and forces it against the top horizontal edges of the supporting plate 226 which stops further movement of the detector arm. Further movement of the cam lowers the arm 342 until the stud 346 contacts with the rocker bar 338 and moves it against stud 354 of the detector arm, in the event that such contact has not already been made during the lowering of the detector arm into contact with the needle. Further movement of the cam raises the lifter arm under the detector arm to lift it out of contact with the needle and the rocker bar. The friction holding shaft 331 is sufficient to hold the rocker bar in place as the lifter arm leaves it but is not so great as to prevent the detector arm from moving the rocker arm as it descends on to the needle or as to prevent the lifter arm moving the rocker bar to correct the position of the rocker bar to the position of the detector arm. In this manner the position of the rocker arm is caused periodically to assume positions corresponding to that of the pointer.

The detector arm 340 is urged in a counterclockwise direction by means of a spring 355 secured at one end to a bracket 356 suitably mounted on supports extending from frame 217 and at the other end in a hole provided in the detector arm.

The edge 352 is preferably curved to obtain a straight line relationship between the position of the needle and the position of the rocker bar. To offset the tendency of such a curved edge to urge the needle to assume inaccurate positions when contacting the needle, a locking arm 357 is provided freely mounted on shaft 341.

Referring to Figure 16, the locking arm is so pivoted that when its lower edge is in a horizontal position and parallel with the top edges of the anvil or support 226 the edges are spaced apart a distance equal to the thickness of the needle. Consequently as the locking arm descends and locks the needle between it and the anvil, it does not tend to urge the needle to assume incorrect positions.

The locking arm is operated by the detector arm. The locking arm carries an adjustable screw stud 359 mounted on an extension 360 extending from the locking arm. The screw is positioned above one of the spacing studs supporting the detector plate on the detector arm. The locking arm is urged in a downwardly or counterclockwise direction by means of a spring 361 attached at its upper end to the bracket 356 and at the lower end to the locking arm.

To hold the detector and lifter arms in raised position irrespective of the cam 344, a frictionally mounted L-shaped arm 400 is secured to a supporting frame 401. The arm may be rotated against its frictional resistance by means of a slotted cap 403 projecting forwardly from the mechanism. The arm is adapted to be rotated to contact with the under surfaces of the detector and lifter arms to hold them in raised position.

The period of the position translating mechanism for moving the flapper in accordance with the position of the galvanometer needle is preferably as rapid as possible so that changes in the demand as indicated by the transmitting mechanism may be transmitted to the pressure regulator as quickly as possible. Some of the factors to be taken into consideration in determining the period of operation of the translating mechanism are the period of the galvanometer and the relationships between the friction of the rocker bar 338 and the masses of the lifter and detector arms effective to move the rocker bar.

The nozzle 311 is caused to follow the position of flapper 312 by means of lever 320 to which is adjustably connected a resilient link 363 connected at its other end to a rack 364, mounted between a bellows 365 and an opposing spring 366. The bellows and spring are held against one another by spacer sleeves and bolts 367 attached to end plates 368 suitably mounted on the back of the case 200. The bellows 365 through tubing 369 is connected with passage 308 in the control head and so is supplied with the same pressure that is maintained in the diaphragm motor 350. As described in the patent to Mason, No. 1,897,135, the nozzle is caused to follow the flapper to maintain the flapper and nozzle in operative relationship, that is, to maintain the nozzle tangent to the flapper. When the flapper moves up to cover the nozzle, maximum back pressure starts building up in the line 316 which tends to cause a decrease of pressure in bellows 365 to move the nozzle away from the flapper. Similarly, when the flapper moves away from the nozzle, pressure in line 316 starts decreasing which tends to cause an increase in pressure in bellows 365 to move the nozzle toward the flapper. The effective relative motion of nozzle and flapper is of the order of .001 of an inch, and hence when the flapper is moved a relatively short distance from the nozzle, the flapper and nozzle are no longer in operative relationship and the pressure in line 316 tends to approach its minimum value. The relative position of the flapper and nozzle within this .001 of an inch range is only approximately proportional to the pressure in the line 316, at any time. However, the net effect of the operations described above is to produce in bellows 365 a mean pressure which is proportional to the position of the flapper. Consequently, for each position of the flapper, a corresponding pressure is set up in the diaphragm motor 350 and the pressures set up in the diaphragm motor correspond with the positions of the galvanometer needle.

A cover plate 370 is provided over the control head 304 to prevent gas from the control head from influencing the position of the galvanometer needle.

It is generally desirable to insure against a failure of pressure in the gas main at the demand end. To this end connection between the control mechanism at the transmitter and the Wheatstone bridge is such that failure of the gas supply or of the instrument to operate satisfactorily due to inadvertent plugging of the lines such as would cause an abnormally low pressure in the diaphragm motor 116, permits spring 124 to move the bar 132 to the extreme left to move the galvanometer to the desired position, which in turn sets the rocker bar and flapper in such position as to maintain minimum pressure in the diaphragm motor 350 to allow the maximum pressure to be delivered by the pressure regulating valve. Short circuiting or failure of the transmission line such as would cause the galvanometer to move to its zero or null position causes the pressure in the diaphragm motor to go to the position corresponding to the galvanometer zero position. Failure of the gas supply to operate the receiving mechanism allows the minimum pressure to exist in the diaphragm motor 350 and the maximum pressure to be delivered by the pressure regulating valve.

As described in the aforementioned Patent No. 1,897,135, the mechanism which controls the pressure at diaphragm motor 116 will keep changing the pressure so long as the pressure in the main or the rate of change of the pressure in the main is not that which is desired. Accordingly, errors which may be introduced through the friction of parts or through inadvertent changes in the electrical circuit due to temperature changes or other causes so as to change the calibration between the transmitter and receiver, are compensated or corrected through the process. If, in response to a change in the demand pressure the transmitter changes its position and the change in position is transmitted incorrectly to the receiver, the pressure regulator will be set inaccurately and the correction in flow will not be such as to bring the pressure at the demand end to that desired. As a result, further changes will be made by the transmitter until the regulator is set in accordance with the actual demand.

We claim:

1. Remote control apparatus for so governing a pressure regulator controlling the flow of gas in a gas line that the value of the pressure in the gas line at a place remote from the pressure regulator is maintained substantially at a desired value comprising first control means responsive to said pressure for establishing an auxiliary pressure approximately proportional to the demand on the gas line, translating sending means associated with said first control means for translating said auxiliary pressure into electrical value proportional to the pressure, conducting means for conducting said electrical value to a point near said pressure regulator, translating receiving means for receiving said electrical value from said conducting means and for translating said electrical value into pressure proportional to said electrical value, second control means located at said pressure regulator and responsive to said last pressure for setting said regulator in proportional correspondence with said pressure, and means for adjusting said translating receiving means and said translating sending means so that failure of said conducting means causes said translating receiving means to set said pressure regulator to supply a desired predetermined flow.

2. Remote control apparatus for so governing a pressure regulator controlling the flow of gas in a gas line that the value of the pressure in the gas line at a place remote from the pressure regulator is maintained substantially at a desired value comprising first control means responsive to said pressure for establishing an auxiliary pressure approximately proportional to the demand on the gas line, translating sending means associated with said first control means for translating said auxiliary pressure into electrical value proportional to the pressure, conducting means for conducting said electrical value to a point near said pressure regulator, translating receiving means for receiving said electrical value from said conducting means and for translating said electrical value into pressure proportional to said electrical value, second control means located at said pressure regulator and responsive to said last pressure for setting said regulator in proportional correspondence with said pressure, and means for adjusting said translating receiving means and said translating sending means so that failure of either said conducting means or said translating sending means causes said translating receiving means to set said pressure regulator to supply less than maximum flow.

3. Remote control apparatus for so governing a regulator controlling flow affecting a process that the value of a condition of the process at a place remote from the pressure regulator is maintained substantially at a desired value comprising first control means responsive to said value of the condition for establishing a pressure proportional to the demand on the process, translating sending means associated with said first control means for translating said pressure into electrical unbalance proportional to the pressure comprising a bridge circuit, means for unbalancing said bridge circuit proportional to said pressure, conducting means for conducting the value of said electrical unbalance to a point near said regulator, a galvanometer located at said regulator responsive to said unbalance and means for translating the position of said galvanometer into pressure proportional to said position, second control means located at said regulator and responsive to said last pressure for setting said regulator in proportional correspondence therewith, and the null point of said galvanometer being so adjusted that failure of said conducting means sets said regulator at a desired predetermined value.

4. Remote control apparatus for governing the pressure in a gas line at a place remote from a valve in the line governing the flow, comprising, in combination, first control means responsive to the pressure in the line for establishing an auxiliary pressure substantially proportional to the demand on the gas line, translating means associated with said first control means for continually translating said pressure into an electrical signal proportional to said pressure, conducting means for conducting said electrical signal to a point near said valve, translating receiving means for receiving said electrical signal from said conducting means and for translating said electrical signal into a pressure proportional to said electrical signal, and a pressure regulator located on said valve for operating the same, said pressure regulator being loaded and unloaded in proportional correspondence with said pressure.

5. In remote control apparatus for controlling the pressure in a gas line by controlling the loading on a pressure regulator at a place remote from the place where the pressure is being controlled, in combination, means responsive to the pressure in the gas line for establishing an auxiliary pressure approximately proportional to the demand on the gas line, a bridge circuit, a movable member for varying the impedance in the bridge circuit, a diaphragm motor for operating said movable member in proportional correspondence with said auxiliary pressure, a galvanometer connected in said bridge circuit but located at said pressure regulator, means in said bridge circuit for compensating for temperature changes in the line connecting said galvanometer and bridge circuit, and means for translating the galvanometer position into loading values on said pressure regulator.

6. Remote control apparatus for governing pressure in a gas line at a place remote from a valve in the line governing the flow therein, comprising, in combination, transmitting means continuously responsive to the pressure at said place for continuously sending an electrical value which is a function of the pressure at said place, receiving means at said valve and electrically connected with said transmitter for continuously influencing said valve in a manner proportional to said electrical value, and means in said control apparatus for adding to said influence a second influence tending to keep the pressure at said place at a control point.

7. In a controlled system involving a variable flow demand and having a condition which is to be maintained substantially constant, flow to said system being governed by a pressure responsive valve and affecting condition responsive means located at such a distance from the valve as to produce undesirable lags in maintaining said condition regardless of variations in said demand, comprising first means responsive to the algebraic sum of the deviation of the value of said condition from said desired point and the integral with respect to time of said deviation for establishing a pressure proportional to the demand on the system, translating sending means associated with said first means for translating said pressure into proportional electrical values, means for electrically conducting said electrical values to a point near said valve, translating receiving means for receiving said electrical values from said conducting means and for translating said electrical values into pressure proportional to said electrical values, and second means responsive to said last pressure for exerting on said valve a control effect proportional to the value of said last pressure.

8. In a controlled system involving a variable flow demand and having a condition which is to be maintained substantially constant, flow to said system being governed by a valve and affecting condition responsive means located at such a distance from the valve as to produce undesirable lags in maintaining said condition regardless of variations in said demand, comprising first means responsive to the algebraic sum of the deviation of the value of said condition from said desired point and the integral with respect to time of said deviation for establishing an electrical value proportional to the demand on the system, means for electrically conducting said electrical value to a point near said valve, and second means at said valve for receiving said electrical value from said conducting means and for exerting on said valve a continuous control effect which is a function of said electrical value.

CUTHBERT J. BROWN.
WEBSTER W. FRYMOYER.
CLESSON E. MASON.

CERTIFICATE OF CORRECTION.

Patent No. 2,229,417. January 21, 1941.

CLESSON E. MASON, ET AL.

It is hereby certified that error appears in the printed specification of the above numbered patent requiring correction as follows: Page 1, second column, line 46, for "remand" read --demand--; page 4, second column, line 50, for "+11" read --desired--; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.